(No Model.)  
4 Sheets—Sheet 1.

N. J. RAFFARD.
ELECTRIC LOCOMOTIVE.

No. 527,126.  Patented Oct. 9, 1894.

WITNESSES:  
A. F. Macdonald  
D. D. Hull

INVENTOR:  
Nicolas Jules Raffard,  
by Geo. R. Blodgett,  
Atty.

(No Model.) 4 Sheets—Sheet 2.
N. J. RAFFARD.
ELECTRIC LOCOMOTIVE.
No. 527,126. Patented Oct. 9, 1894.
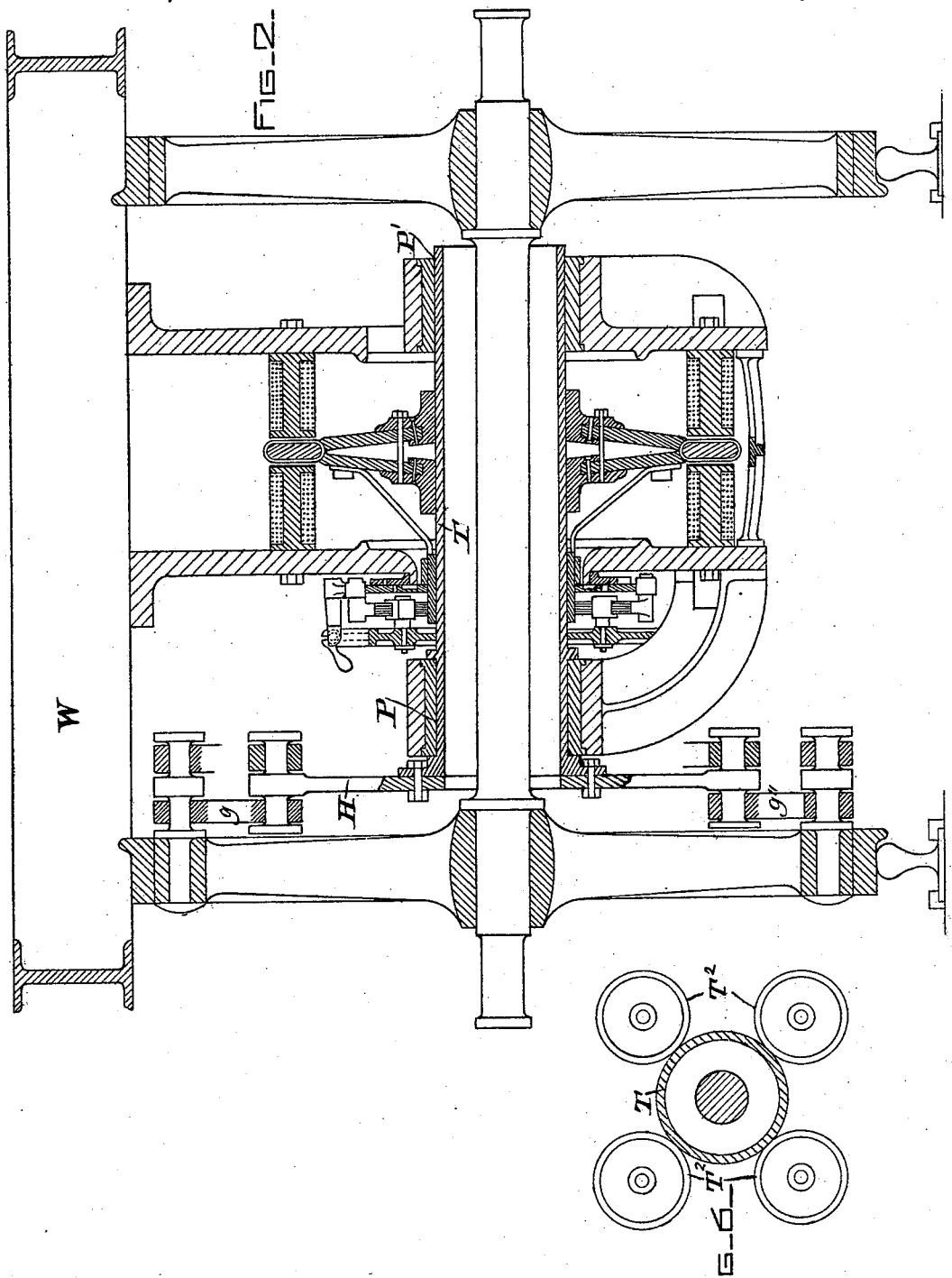

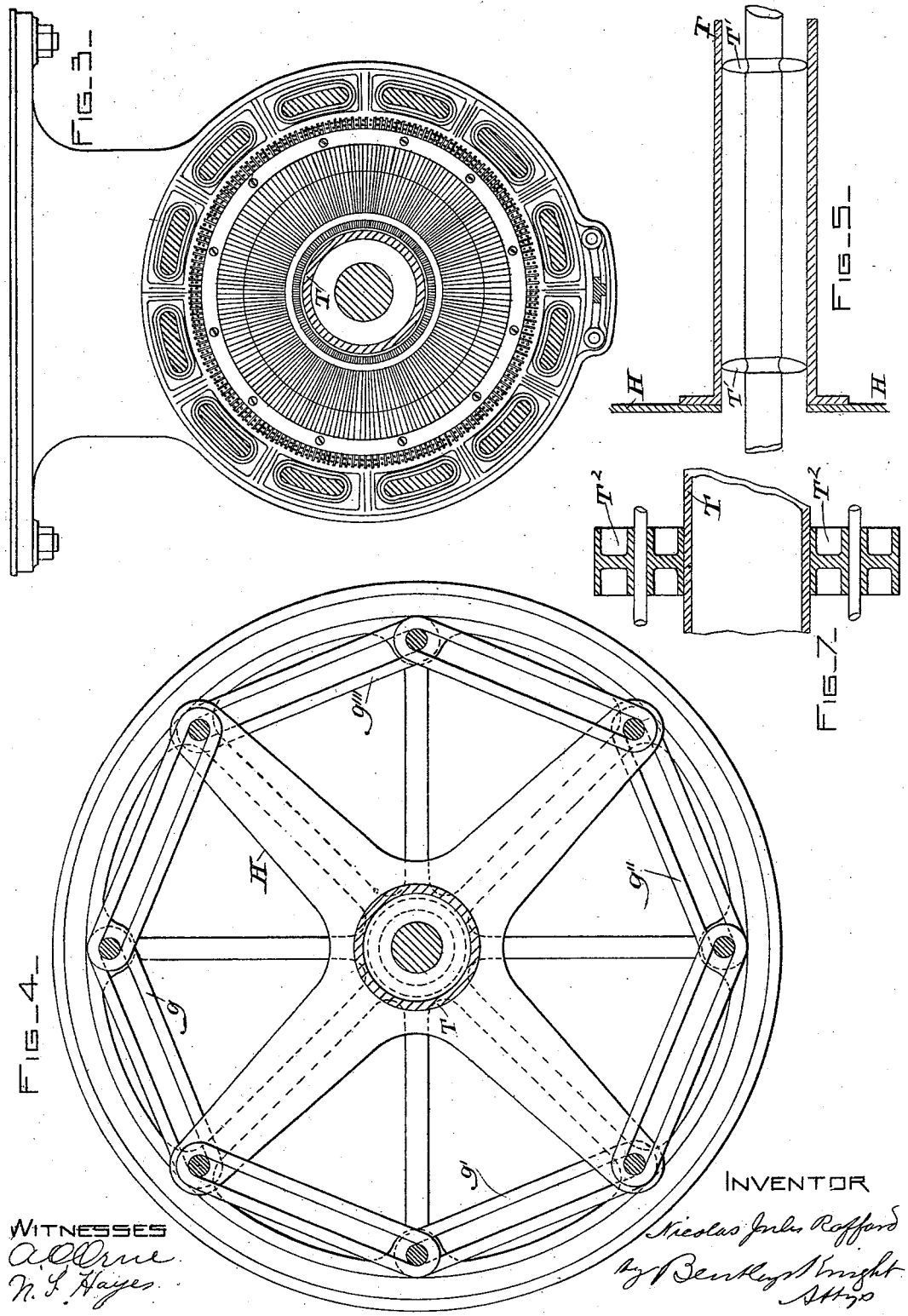

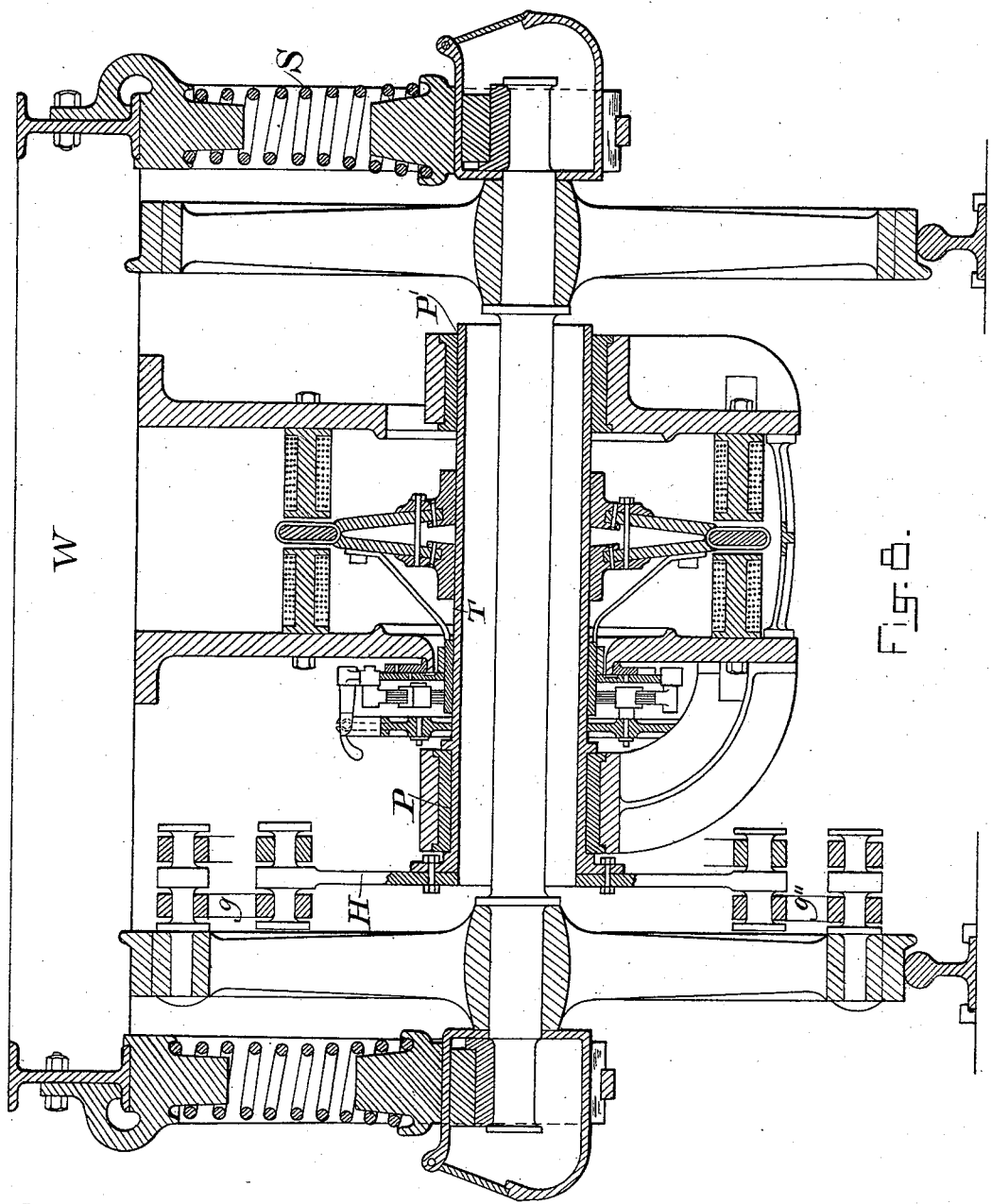

UNITED STATES PATENT OFFICE.

NICOLAS JULES RAFFARD, OF PARIS, FRANCE, ASSIGNOR TO THE THOMSON-HOUSTON ELECTRIC COMPANY, OF CONNECTICUT.

ELECTRIC LOCOMOTIVE.

SPECIFICATION forming part of Letters Patent No. 527,126, dated October 9, 1894.

Application filed July 23, 1891. Renewed April 13, 1894. Serial No. 507,460. (No model.) Patented in France September 10, 1883, No. 157,466.

*To all whom it may concern:*

Be it known that I, NICOLAS JULES RAFFARD, a citizen of the Republic of France, residing at Paris, France, have invented certain new and useful Improvements in Electric Locomotives, (patented in France September 10, 1883, No. 157,466,) of which the following is a specification.

The present invention relates to an electric locomotive which is moved by one or more electric motors of any type, whose armatures or rotating bobbins are integral with hollow arbors placed concentric with the mean position of the axles. These hollow arbors turn in bearings attached to suspended frames, and transmit the movement to the drive wheels through the intermediation of elastic connections. The electric energy which actuates the electric motor is furnished either by electric batteries, or by accumulators carried by the electric locomotive, or again by any system of conductors in communication with a distant source of electricity.

An electric locomotive embodying the above features is shown in the accompanying drawings.

Figure 9:
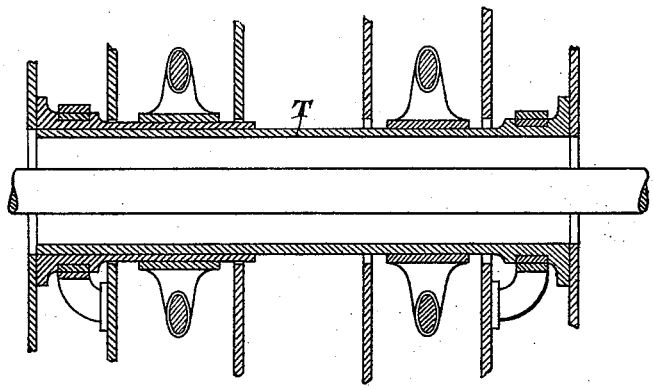
Figure 1:
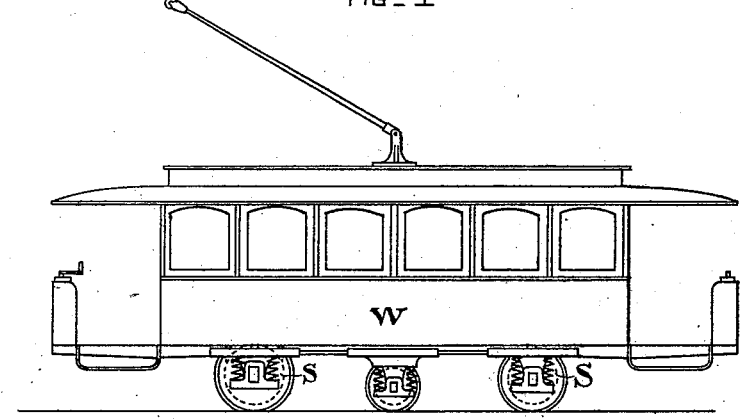

Figure 1 is a diagrammatic elevation of the locomotive body and wheels; Fig. 2, an axial section through the motor, drivewheels and connecting parts; Fig. 3, a transverse view of the motor; Fig. 4, an end view of the drive wheel and connections for driving the same; Figs. 5, 6 and 7, illustrations of features and modifications hereinafter explained, and Fig. 8 is a view similar to Fig. 2 showing the springs which support the battery box and the motion. Fig. 9 is an axial section through the hollow arbor and two dynamos mounted thereon.

The electric locomotive is composed, first, (Fig. 1) of a box W destined to receive the accumulators or electric batteries and supported from the axles by springs S; second, of one, two, three or more axles (motive or otherwise), as indicated in Fig. 1, carrying wheels preferably of different diameter, in order to permit the motors which control them to have different speeds, it being understood that the two wheels of the same axle are always of equal diameter; third, of one or more electric motors of any sort, (capable of forward and backward movement) mounted rigidly on a tube or hollow arbor or shaft T (Fig. 2) which turns in bearings P, P' connected rigidly to the suspended box W; fourth, of a hollow arbor T, Figs. 2 and 3 carrying the electric motor or motors, and having an interior diameter sufficiently great to permit the axle traversing it to operate without ever coming in contact therewith, in spite of the movement caused by the elasticity of the springs and the irregularities of the track; fifth, of a cross-frame (spider) or disk H fixed rigidly to the hollow arbor T and whose arms, greater or less in number, are connected to an equal number of studs fixed to the arms of one of the driving wheels belonging to the same axle by means of links or tires (couplings) of caoutchouc or of elastic links of any kind, $g$, $g'$, $g''$, $g'''$ placed oppositely to permit of the forward and the backward movements.

As an obvious modification I may use rigid links. In this case the arms of the cross frame will be flexible and formed like ordinary springs.

I prefer to put two dynamos on a single hollow arbor T (Fig. 9) and to control each of the two wheels separately by one only of these motors by means of a cross-frame and elastic links. In this case only one of the wheels would be fastened to the axle, and the other would be loose thereon.

For attenuating the vibrations of the axle, injurious to the integrity of the apparatus, especially at great speeds, I may place between this latter and the tube, or hollow arbor T, one or more light, elastic collars T' (Fig. 5). Furthermore, instead of making the hollow arbor T turn in bearings P, P' (Fig. 2) I may employ a system of rollers, Figs. 6 and 7 or spheres $T^2$ rolling in an appropriate channel, or any other system destined to diminish the friction of the parts in turning.

It will be seen that the links $g$, $g'$, $g''$, $g'''$, as above described, constitute yielding or flexible connections between the armature and axle, allowing relative movement of the armature and axle in a direction transverse to the axle, and also by virtue of the elasticity of the connection allowing relative rotary movement of the armature and axle. Thus by the term flexible connection, as used in my claims I mean any connection which will transmit the rotary motion of the armature to the axle, while allowing of such slight relative movements as may be caused by vibrations or shocks imparted to either member.

What I claim as new, and desire to secure by Letters Patent, is—

1. The combination in an electric locomotive, of an electric motor supported from the axle through spring supports allowing of relative movements due to vibrations of the parts, a part driven by the motor and surrounding the axle, but out of direct or rigid contact therewith, and a flexible driving connection between such part and the axle.

2. The combination in an electric locomotive, of a driving axle, and an electric motor having its armature surrounding the axle, but leaving a space or play around the same sufficient to permit relative vibrations, and driving connections between the armature and axle.

3. The combination in an electric locomotive, of a driving axle, and an electric motor for the same having its armature attached to a tube or hollow shaft, leaving around the axle a space or play sufficiently great to permit it to follow the irregularities of the track without coming in contact with the hollow arbor, thereby protecting the motor from the vibrations or shocks occasioned by the rolling and the imperfections of the track.

4. The combination in an electric locomotive, of a driving axle, and an electric motor for the same having its field magnet or magnets carried by frames supported on the axle and having its armature attached to a tube or hollow shaft journaled in said frame, leaving around the axle a space or play sufficient to permit vibration of the axle.

5. The combination with a driving axle of an electric locomotive, of an electric motor for the same having its armature attached to a hollow shaft surrounding the axle, but leaving a space around the same, elastic collars or cushions in said space between the axle and hollow shaft, and driving connections between the hollow shaft and the axle or wheels.

6. The combination with a driving axle of an electric locomotive, of an electric motor for the same having its armature attached to a hollow shaft surrounding the axle but leaving a space around the same, elastic collars or cushions in said space between the axle and hollow shaft, and flexible driving connections between the hollow shaft and the axle or wheels.

7. The combination in an electric locomotive, of a driving axle, an armature surrounding said axle, but not in direct or rigid contact therewith, and a flexible driving connection between said armature and axle permitting movement of the axle within the armature.

8. The combination in an electric locomotive, of a driving axle, an armature surrounding said axle but not in direct or rigid contact therewith, arms or projections respectively attached to said armature and axle, and yielding or elastic devices engaging with and operatively connecting said arms.

9. The combination in an electric locomotive, of a driving axle, an armature surrounding said axle but not in direct or rigid contact therewith, arms or projections respectively attached to said armature and axle, and links engaging with and operatively connecting said arms.

10. The combination in an electric locomotive, of a driving axle, an armature surrounding said axle but not in direct or rigid contact therewith, arms or projections attached to said armature and axle, and elastic links engaging with and operatively connecting said arms.

11. An electric locomotive having a frame spring-supported from bearings on the axles, an electric motor having its field magnet supported by said frame, and its armature journaled in said frame, said armature surrounding the axle, but being out of direct or rigid contact therewith and flexible driving connections between said armature and axle, for the purpose set forth.

12. An electric locomotive having a driving motor with its field magnet mounted on a frame spring-supported on the axles and its armature journaled in the field magnet frame and surrounding the driving axle, but being out of direct or rigid contact therewith, and flexible driving connections between said armature and axle.

13. An electric motor surrounding the axle and having multipolar field-magnets presented endwise to the armature, and having an armature of the full diameter of the motor.

14. The combination of the driving axle, the frame journaled thereon, the electric motor with a hollow armature surrounding the axle but separated therefrom by a space permitting play, and roller bearings for said hollow armature carried by the aforesaid frame.

15. In an electric locomotive, the combination of a driving axle with a motor whose armature surrounds the axle and oppositely placed driving connections between the armature and axle for forward and backward movement.

16. In an electric locomotive, the combination of driving axles having the wheels of one axle of different diameter from those of another, and motors mounted on and driving each driving axle.

In testimony whereof I have hereunto set my hand this 10th day of July, 1891.

NICOLAS JULES RAFFARD.

Witnesses:
ERNST THURNANCE,
A. M. TANNER.